US012728565B2

(12) United States Patent
Hackfort et al.

(10) Patent No.: US 12,728,565 B2
(45) Date of Patent: Sep. 8, 2026

(54) SENSOR SYSTEM FOR DRY POWDER ELECTRODE FORMATION AND METHODS OF USING THE SAME

(71) Applicant: Matthews International Corporation, Pittsburgh, PA (US)

(72) Inventors: Thomas Hackfort, Ahaus-Altstätte (DE); Jörg Gottszky, Vreden (DE); Kay Wolters, Stadtlohn (DE)

(73) Assignee: Matthews International Corporation, Pittsburgh, PA (US)

( * ) Notice: Subject to any disclaimer, the term of this patent is extended or adjusted under 35 U.S.C. 154(b) by 0 days.

(21) Appl. No.: 18/706,042

(22) PCT Filed: Nov. 4, 2022

(86) PCT No.: PCT/US2022/048968
§ 371 (c)(1),
(2) Date: Apr. 30, 2024

(87) PCT Pub. No.: WO2023/081363
PCT Pub. Date: May 11, 2023

(65) Prior Publication Data

US 2024/0417177 A1 Dec. 19, 2024

Related U.S. Application Data

(60) Provisional application No. 63/275,863, filed on Nov. 4, 2021.

(51) Int. Cl.

| | |
|---|---|
| ***B29C 31/02*** | (2006.01) |
| ***B29C 43/24*** | (2006.01) |
| ***B29C 43/34*** | (2006.01) |
| ***B29C 43/58*** | (2006.01) |
| ***B65B 1/32*** | (2006.01) |

(Continued)

(52) U.S. Cl.
CPC .............. *B29C 31/02* (2013.01); *B29C 43/24* (2013.01); *B29C 43/34* (2013.01); *B29C 43/58* (2013.01);

(Continued)

(58) Field of Classification Search
CPC ......... B29C 31/02; B29C 43/24; B29C 43/58; B65B 1/32; B65G 3/04
See application file for complete search history.

(56) References Cited

U.S. PATENT DOCUMENTS

| | | |
|---|---|---|
| 3,889,571 A | 6/1975 | Coetzee |
| 4,711,663 A | 12/1987 | Ferrari |

(Continued)

FOREIGN PATENT DOCUMENTS

| | | |
|---|---|---|
| CN | 214165349 | 9/2021 |

OTHER PUBLICATIONS

Patent Cooperation Treaty, PCT/US2022/048968, International Search Report, Feb. 10, 2023.

(Continued)

*Primary Examiner* — Jason K Niesz
(74) *Attorney, Agent, or Firm* — Jones Day

(57) ABSTRACT

Systems and methods of providing powder are disclosed. A system includes a powder hopper, one or more sensors, a feeder hopper and a processor in operable communication with the one or more sensors and the feeder hopper. The powder hopper is configured to provide a powder to a pair of rollers. Each of the one or more sensors is configured to determine a characteristic of the powder in the powder hopper. The feeder hopper is configured to provide the powder to the powder hopper. The processor is configured to cause the feeder hopper to provide the powder to the powder hopper in response to the characteristic of the powder in the powder hopper being less than a threshold.

19 Claims, 5 Drawing Sheets

(51) Int. Cl.

| | |
|---|---|
| ***B65G 3/04*** | (2006.01) |
| ***G01F 23/292*** | (2006.01) |
| ***G01N 9/02*** | (2006.01) |
| ***H01G 11/24*** | (2013.01) |
| ***H01G 11/86*** | (2013.01) |
| *B29L 31/34* | (2006.01) |
| *H01G 13/00* | (2013.01) |
| *H01M 4/04* | (2006.01) |

(52) U.S. Cl.

CPC .................. *B65B 1/32* (2013.01); *B65G 3/04* (2013.01); *G01F 23/292* (2013.01); *G01F 23/2921* (2013.01); *G01N 9/02* (2013.01); *H01G 11/24* (2013.01); *H01G 11/86* (2013.01); *B29C 2043/5875* (2013.01); *B29L 2031/3406* (2013.01); *G01N 2009/024* (2013.01); *H01G 13/00* (2013.01); *H01M 4/0435* (2013.01)

(56) References Cited

U.S. PATENT DOCUMENTS

| | | | | |
|---|---|---|---|---|
| 4,765,599 | A | 8/1988 | Ferrari | |
| 5,078,090 | A | 1/1992 | Richman | |
| 5,868,326 | A | 2/1999 | Speegle | |
| 2004/0060367 | A1 * | 4/2004 | Bergman | B65B 37/18 73/861.41 |
| 2007/0092593 | A1 | 4/2007 | Dopp et al. | |
| 2015/0255778 | A1 | 9/2015 | Orisaka et al. | |
| 2018/0243768 | A1 | 8/2018 | Coward et al. | |
| 2020/0038958 | A1 | 2/2020 | Kuklinski | |
| 2020/0227722 | A1 | 7/2020 | Bogenstahl et al. | |

OTHER PUBLICATIONS

European Patent Office, Appl. 22890824.0, Extended European Search Report, Sep. 8, 2025.

* cited by examiner

SENSOR SYSTEM FOR DRY POWDER ELECTRODE FORMATION AND METHODS OF USING THE SAME

CROSS-REFERENCE TO RELATED APPLICATIONS

This application is a U.S. National Stage Application under 35 U.S.C. § 371 of International Patent Application No. PCT/US2022/048968, filed Nov. 4, 2022, which claims priority to U.S. Provisional Application No. 63/275,863, filed Nov. 4, 2021, the disclosures of which are incorporated by reference in their entireties.

FIELD

The present disclosure relates to systems and methods for manufacturing electrodes from dry powder. More specifically, the present disclosure relates to systems and methods for controlling the supply of dry powder to a calendering system used to manufacture electrodes.

BACKGROUND

An electrode is a conductor through which an electrical charge enters or leaves an object. Electrodes can be implemented as part of electrical energy storage cells, which are widely used to provide power to electronic, electromechanical, electrochemical, and other useful devices. Energy storage cells include batteries, such as primary chemical cells and secondary (rechargeable) cells, fuel cells, and various species of capacitors, including ultracapacitors.

Electrodes have traditionally been made using a wet process in which an active material, binder and conductive agent are mixed together into a slurry. The slurry is then applied to a current collector substrate and dried. Solvents are recovered after the initial drying process. The substrate is passed through a calendering system to compress the substrate and is dried again. The substrate is cut into pieces to form the electrodes.

One problem with conventional "wet" electrode production is that the recovery of solvents is an expensive, environmentally impactful, and potentially dangerous process. The solvents that are used are toxic chemicals that could be harmful to operators. Moreover, the drying operations, which result in solvent evaporation, require a significant amount of energy to be expended as well. The solvents must be collected and properly disposed of in order to prevent harm to the environment or those managing the operation.

More recently, "dry" (i.e., solvent-free) electrode manufacturing processes are being considered. Dry electrode manufacturing processes eliminates the need for solvents. Instead, such processes place a dry powder material on a substrate and press the powder into electrodes using a calendering process. Because dry electrode manufacturing processes do not use solvents, the cost of the solvents and the toxicity associated with them are eliminated. Moreover, the drying processes used to recover the solvents from the substrate are also no longer required.

However, tight tolerances on electrodes requires a consistent manufacturing process. In order to achieve this goal, uniform application of the powder used to form the electrodes is required.

SUMMARY

In some embodiments, a system includes a first powder hopper, one or more first sensors, a first feeder hopper and a processor in operable communication with the one or more first sensors and the first feeder hopper. The first powder hopper is configured to provide a first powder to a first pair of rollers. Each of the one or more first sensors is configured to determine a characteristic of the first powder in the first powder hopper. The first feeder hopper is configured to provide the first powder to the first powder hopper. The processor is configured to cause the first feeder hopper to provide the first powder to the first powder hopper in response to the characteristic of the first powder in the first powder hopper being less than a first threshold.

In some embodiments, the first powder hopper is positioned adjacent to the first pair of rollers.

In some embodiments, the one or more first sensors comprise a level sensor, and the characteristic of the first powder comprises a height of the first powder within the first powder hopper.

In some embodiments, the one or more first sensors comprise a weight sensor, and the characteristic of the first powder comprises a weight of the first powder within the first powder hopper.

In some embodiments, the system further includes a second powder hopper, one or more second sensors, and a second feeder hopper. The second powder hopper is configured to provide a second powder to a second pair of rollers. Each of the one or more second sensors is configured to determine a characteristic of the second powder in the second powder hopper. The second feeder hopper configured to provide the second powder to the second powder hopper. The processor is also in operable communication with the one or more second sensors and the second feeder hopper and is further configured to cause the second feeder hopper to provide the second powder to the second powder hopper in response to the characteristic of the second powder in the second powder hopper being less than a second threshold.

In some embodiments, the second powder hopper is positioned adjacent to the second pair of rollers.

In some embodiments, the one or more second sensors comprise a level sensor, and the characteristic of the second powder comprises a height of the second powder within the second powder hopper.

In some embodiments, the one or more second sensors comprise a weight sensor, and the characteristic of the second powder comprises a weight of the second powder within the second powder hopper.

In some embodiments, the first powder is the same as the second powder. In alternate embodiments, the first powder is different from the second powder.

In some embodiments, the first feeder hopper is connected to the second feeder hopper.

In some embodiments, a method includes providing first powder from a first powder hopper to a first pair of rollers, determining, by at least one first sensor, a characteristic of the first powder within the first powder hopper, and delivering first powder from a first feeder hopper to the first powder hopper in response to the characteristic of the first powder being less than a first threshold.

In some embodiments, the first powder hopper is positioned adjacent to the first pair of rollers.

In some embodiments, the at least one first sensor comprises a level sensor, and the characteristic of the first powder comprises a height of the first powder within the first powder hopper.

In some embodiment, the at least one first sensor comprises a weight sensor, and the characteristic of the first powder comprises a weight of the first powder within the first powder hopper.

In some embodiments, the method further includes providing second powder from a second powder hopper to a second pair of rollers; determining, by at least one second sensor, a characteristic of the second powder within the second powder hopper; and delivering second powder from a second feeder hopper to the second powder hopper in response to the characteristic of the second powder being less than a second threshold.

In some embodiments, the second powder hopper is positioned adjacent to the second pair of rollers.

In some embodiments, the at least one second sensor comprises a level sensor, and the characteristic of the second powder comprises a height of the second powder within the second powder hopper.

In some embodiments, the at least one second sensor comprises a weight sensor, and the characteristic of the second powder comprises a weight of the second powder within the second powder hopper.

BRIEF DESCRIPTION OF THE DRAWINGS

Aspects, features, benefits and advantages of the embodiments described herein will be apparent with regard to the following description, appended claims, and accompanying drawings where:

DETAILED DESCRIPTION

Figure 1:
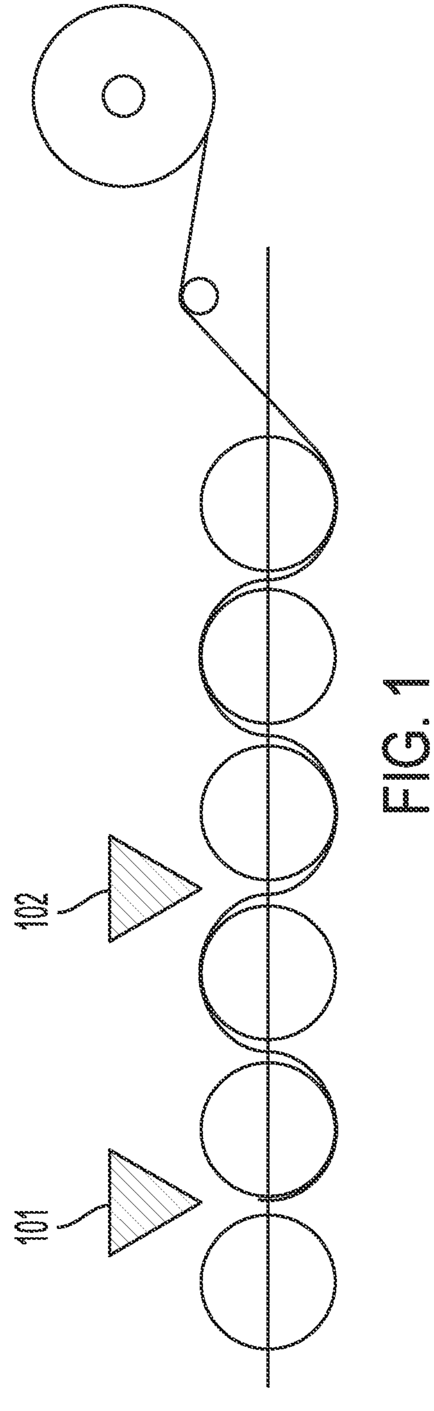
FIG. 1 depicts a schematic view of an illustrative multi-roll calendering system in accordance with an embodiment.

This disclosure is not limited to the particular systems, devices and methods described, as these may vary. The terminology used in the description is for the purpose of describing the particular versions or embodiments only and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

Energy storage cells or devices, such as lithium-ion batteries, have been relied upon as power sources in numerous commercial and industrial applications, such as, for example and without limitation, consumer devices, productivity devices, and battery powered vehicles. Demands placed on energy storage devices are continuously growing. For example, the automotive industry is developing vehicles that rely on compact and efficient energy storage, such as plug-in hybrid and pure electric vehicles. Lithium ion batteries are well-suited to meet future demands.

Electrodes are key components in determining and/or improving the storage potential of an energy storage device. The electromechanical capabilities of electrodes, for example, the capacity and efficiency of battery electrodes, are governed by various factors. The factors include, for example and without limitation, the distribution of an active material, a binder, and one or more additives; the physical properties of the active material, binder and additives, such as the particle size and the surface area of the active material; the surface properties of the active material; and the physical characteristics of the electrode film, such as the film's density, porosity, and cohesiveness, and the adhesiveness of the film to a conductive element.

Dry electrode manufacturing systems and methods traditionally use a high shear and/or high pressure processing step to break up and commingle electrode film materials. Such systems and methods may contribute to structural advantages over electrode films produced using a wet process. However, the high processing pressures and large amount of equipment (and thus, the large footprint) used to form dry, self-supporting electrode films and dry electrodes leave room for improvement.

The systems and methods provided herein can be implemented to manufacture dry electrode films and electrodes for various energy storage devices. As provided herein, an energy storage device can be a capacitor, a lithium ion capacitor (LIC), an ultracapacitor, a battery such as a lithium ion battery, or a hybrid energy storage device combining aspects of two or more of the foregoing.

The various embodiments described herein provide for improved manufacturing of dry electrode films and dry electrodes for use in energy storage devices. The disclosed embodiments can provide a simplified and cost-effective procedure for manufacturing energy storage devices.

Embodiments of systems and methods for forming dry electrode films disclosed herein can provide one or more advantages over conventional systems and methods. Some embodiments allow for the fabrication of electrodes having uniform thickness in wide-format, high-precision, low-tolerance films. Some embodiments allow for enabling multi-layer functional webs by using one or more dry electrode material delivery systems, such as powder delivery hoppers. Some embodiments enable the provision of a consistent amount of dry powder for the production of films in order to produce a consistent end product. Additional features or advantages provided by embodiments herein will be apparent to those of ordinary skill in the related art.

In some embodiments, a calendering system includes a hopper configured to contain a powder. The hopper is configured to ensure that the provision of the powder to rollers in the calendering system results in the formation of a film having uniform thickness. In some embodiments, the film may be used for the formation of dry electrodes.

FIG. 1 depicts a schematic view of an illustrative multi-roll calendering system in accordance with an embodiment. The calendering system as shown in FIG. 1 comprises six rollers, although more or fewer rollers may be used. The calendering system can include one or more dry electrode material delivery systems, such as powder delivery hoppers. For illustrative purposes, the system in FIG. 1 includes two powder hoppers 101 and 102, although more or fewer powder hoppers may be used within the scope of this disclosure. In some embodiments, the particle sizes, density, porosity and/or types of materials, and/or other material characteristics for the powder in powder hopper 101 and the powder in powder hopper 102 may differ with respect to each other. In alternate embodiments, the material characteristics for the powder in powder hoppers 101 and 102 may be the same.

Figure 2:
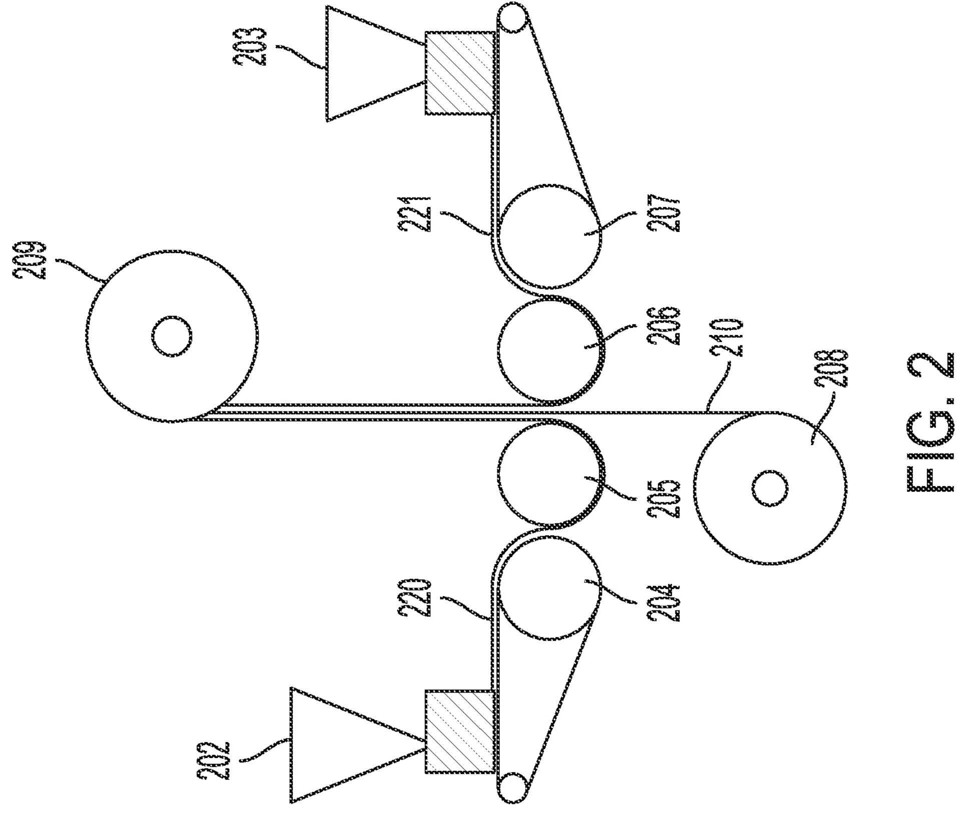
FIG. 2 depicts a combination calender/laminator system configured to manufacture two dry electrode films and laminate each dry electrode film to a current collector to form a double-sided electrode in accordance with an embodiment.

FIG. 2 depicts a combination calender/laminator system 200 configured to manufacture two dry electrode films and laminate each dry electrode film to a current collector to form a double-sided electrode. As shown in FIG. 2, a first powder hopper 202 may be configured to provide a powder to a first set of rollers 204 and 205, and a second powder hopper 203 may be configured to provide a powder to a second set of rollers 206 and 207. A current collector 210 may be provided from a current collector source 208. A first dry electrode film 220 may be formed by calendering particles from the first powder hopper 202 through a first nip formed from the first set of rollers 204 and 205. A second dry electrode film 221 may be formed by calendering particles from the second powder hopper 203 through a second nip formed between the second set of rollers 206 and 207. The first and second dry electrode films 220 and 221 may be laminated onto first and second opposing sides, respectively, of the current collector 210. In some embodiments, the lamination may be provided by compressing (e.g., calendering) the first and second dry electrode films 220 and 221 and the current collector 210 between a third nip formed between, for example, roll 205 and 206. In some embodiments, the third nip may also provide additional calendering and tuning of the film thickness of the first and second dry electrode films 220 and 221. After laminating the electrode films 220 and 221 and the current collector 210, the double-sided electrode may be collected for further processing, for example, via a rewind station 209.

As shown in FIG. 2, the roll nips may be positioned in sequence, and close together, to provide for continuous calendering and film thickness reduction. This may reduce or completely negate the need for idler or dancer rollers in the calendering system. Each of the rollers 204-207 may be controlled for velocity and/or acceleration. For example, subsequent rollers, such as 205 and 206, may each turn slightly faster than previous rollers, such as 204 and 207, thereby allowing the film to follow the rollers to the last section where the film is pulled off the last roll and wound on the rewind station 209.

In an alternate embodiment, the system depicted in FIG. 2 may be implemented to produce a single-sided electrode by, for example and without limitation, eliminating roll 207 and the second powder hopper 203. Such a system would not produce electrode film 221. In some embodiments, rollers 204 and 207 may be part of a belt-calendering system in which the belt provides additional support and surface area for application of dry electrode material thereupon. One or more belt systems, such as rollers 204 and 207, or one or more non-belt systems, such as 205 and 206, or combinations thereof, may be implemented in accordance with the knowledge of those of ordinary skill in the related art.

Figure 3:
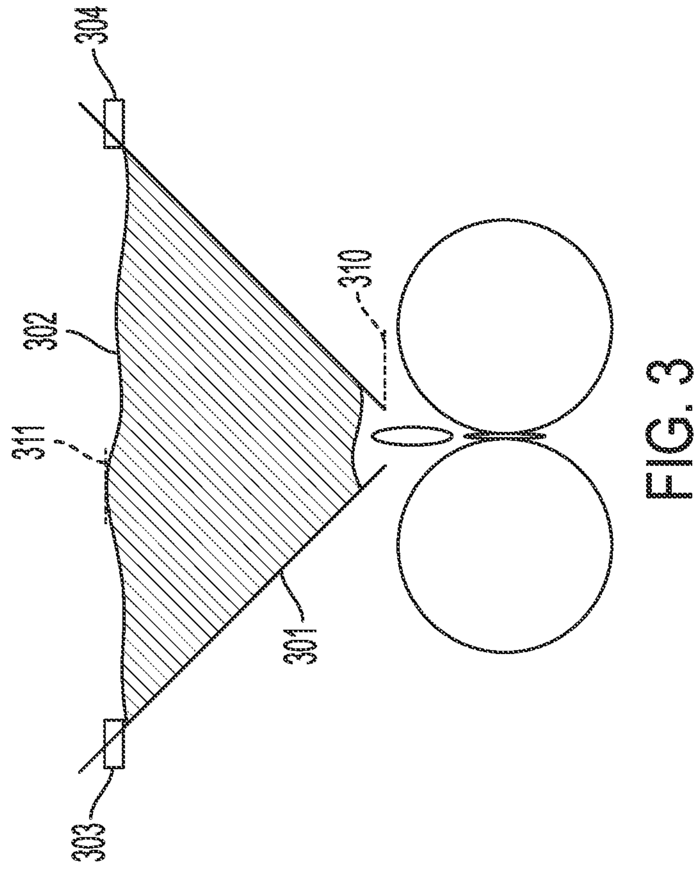
FIG. 3 depicts a calendering system having a hopper in accordance with an embodiment.

FIG. 3 depicts a calendering system having a hopper in accordance with an embodiment. As shown in FIG. 3, a powder hopper 301 may include a quantity of powder 302 during operation. The powder hopper 301 may include one or more sensors, such as 303 and 304, configured to sense a characteristic of the powder 302 and/or the powder hopper.

In some embodiments, a first sensor 303 may be configured to determine a weight of the powder 302 within the powder hopper 301. In some embodiments, the first sensor 303 may be configured to determine a weight of the powder hopper 301. In such embodiments, the first sensor 303 may initially be used to determine a first weight of the powder hopper 301 when it is devoid of powder 302 and a second weight of the hopper when the powder hopper is laden with powder. In such an embodiment, a plurality of second weights of the powder hopper 301 may be determined by the first sensor 303 at periodic or aperiodic intervals. In some embodiments, a processor may use a second weight to determine the weight of the powder 302 in the powder hopper 301 at a time when the second weight is sensed by subtracting the first weight from the second weight.

In some embodiments, a second sensor 304 may be configured to determine a level of the powder 302 within the powder hopper 301. For example, the second sensor 304 may determine whether the powder 302 within the powder hopper 301 exceeds a height threshold, such as a distance from a location 310 at which powder is configured to be released from the powder hopper to a peak 311 of the powder within the powder hopper. In some embodiments, a light beam may be emitted by a light source (not shown) and received by the second sensor 304 if the peak 311 of the powder 302 is below a threshold. When the peak 311 of the powder 302 is above the threshold, the light beam may be interrupted and not received by the second sensor 304. The location of the light source and/or second sensor 304 may be determined based on an expected quantity of powder 302 to be present in the powder hopper 301 during normal operation.

Alternate and/or additional embodiments of systems used to sense an amount of powder in a powder hopper will be apparent to those of ordinary skill in the related art based on the teachings of the present disclosure.

In some embodiments, one or more sensors may be spaced along a width of the hopper in order to determine the peak, height, density, weight or other characteristic(s) of the powder at various points throughout the hopper. The location of such peak, height, density, and weight sensors is not limited to the location of the first sensor 303 of the second sensor 304 in FIG. 3. For example, weight or pressure (load) sensors can be placed along the sides of the powder hopper 301, alone or in combination with a sensor 304 configured to detect the peak or height.

Figure 4:
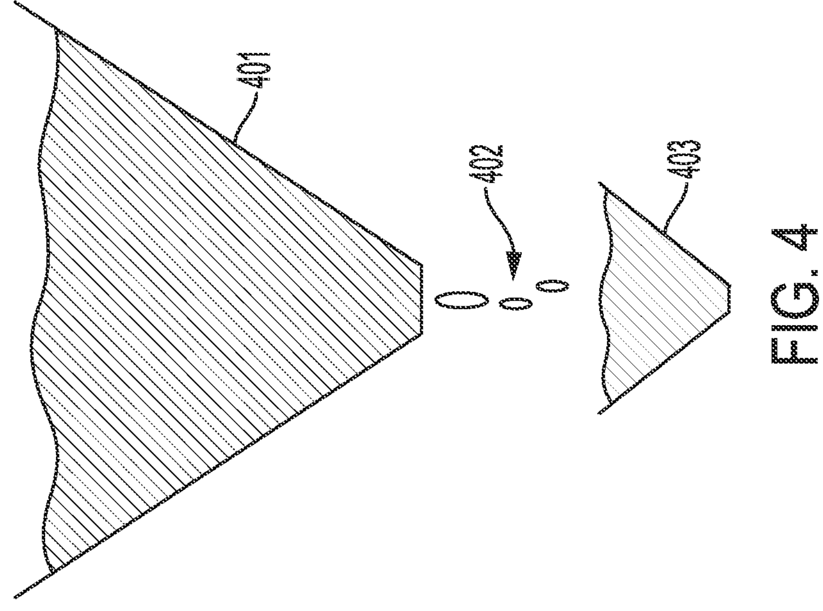
FIG. 4 depicts an illustrative feeder hopper configured to provide a powder to a powder hopper in accordance with an embodiment.

FIG. 4 depicts an illustrative feeder hopper configured to provide a powder to a powder hopper in accordance with an embodiment. As shown in FIG. 4, a feeder hopper 401 is configured to feed a pre-determined amount or, over time, a pre-determined rate of powder 402 to the powder hopper 403. The feeder hopper 401 may have a variable feed rate to control the amount of or the rate at which the powder 402 is provided or fed to the powder hopper 403.

In some embodiments, a plurality of feeder hoppers may be used to supply a plurality of powder hoppers. In some embodiments, the plurality of feeder hopes may be connected to each other. In other words, the plurality of feeder hoppers may contain a common reservoir containing powder. In such an embodiment, each feeder hopper may have a different release point at which powder is released to a corresponding powder hopper.

Having a precise amount of powder in a powder hopper may enable a calendering system to achieve precise deposition and formation of electrodes. In particular, having a precise amount of powder in a powder hopper may enable the system to provide a uniform feed of powder to the calendering system. By having a consistent amount of powder in the powder hopper, the density of the powder entering the nip may be uniform throughout the formation of a film, such as a dry electrode film. As such, the amount of variability in the film may be substantially reduced.

Figure 5:
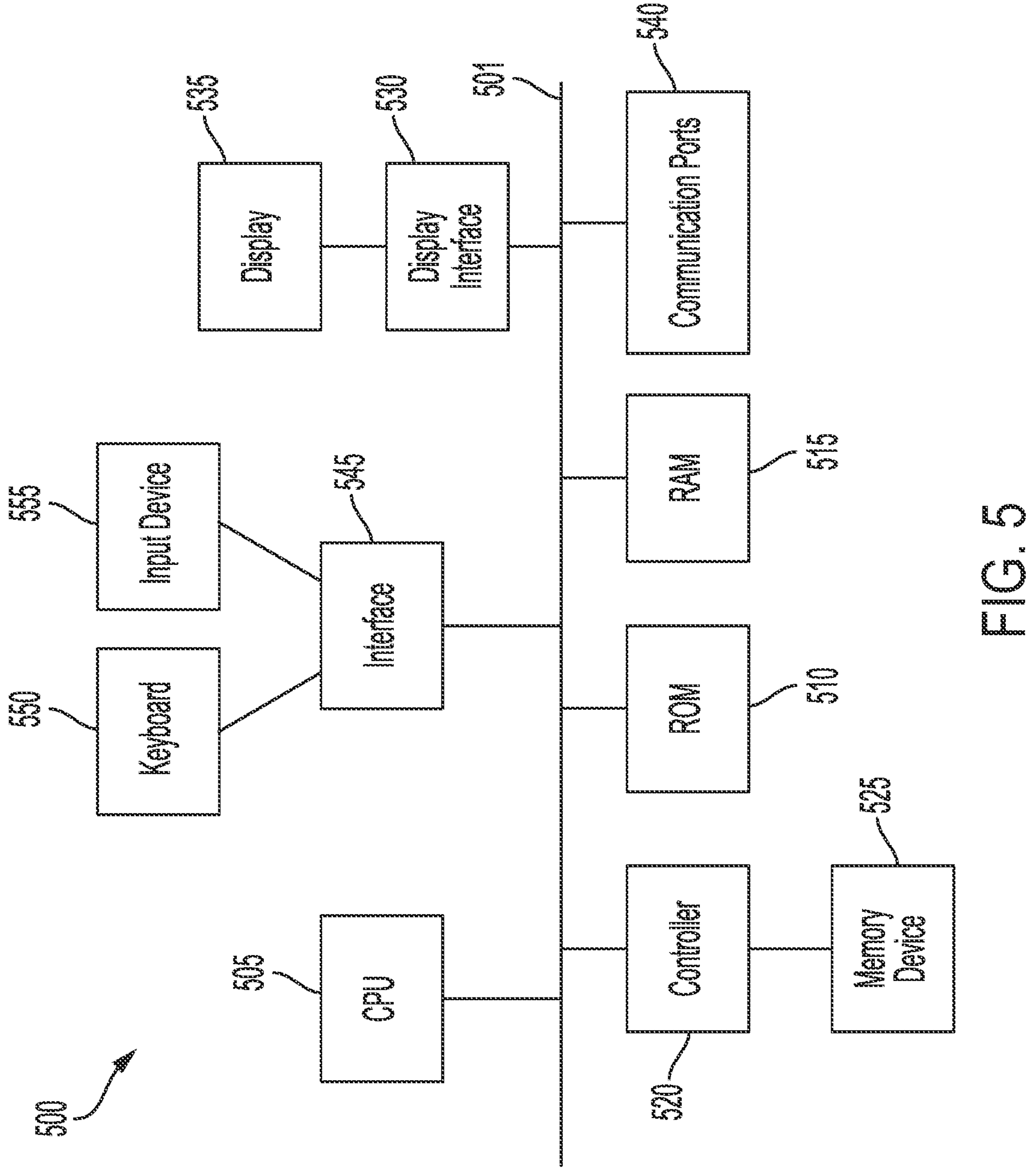
FIG. 5 depicts a block diagram of an illustrative computing device according to an embodiment.

FIG. 5 depicts a block diagram of illustrative internal hardware that may be used to contain or implement program instructions, such as the process steps discussed herein, according to various embodiments. A bus 500 may serve as the main information highway interconnecting the other illustrated components of the hardware. A CPU 505 is the central processing unit of the system, performing calculations and logic operations required to execute a program. The CPU 505, alone or in conjunction with one or more of the other elements disclosed in FIG. 5, is an illustrative processing device, computing device or processor as such terms are used within this disclosure. Read only memory (ROM) 510 and random access memory (RAM) 515 constitute illustrative memory devices (i.e., processor-readable non-transitory storage media).

A controller 520 interfaces with one or more optional memory devices 525 to the system bus 500. These memory devices 525 may include, for example, an external or internal DVD drive, a CD ROM drive, a hard drive, flash memory, a USB drive, or the like. As indicated previously, these various drives and controllers are optional devices.

Program instructions, software, or interactive modules for providing the interface and performing any querying or analysis associated with one or more data sets may be stored in the ROM 510 and/or the RAM 515. Optionally, the program instructions may be stored on a tangible computer-readable medium such as a compact disk, a digital disk, flash memory, a memory card, a USB drive, an optical disc storage medium, such as a Blu-Ray™ disc, and/or other non-transitory storage media.

An optional display interface 530 may permit information from the bus 500 to be displayed on the display 535 in audio, visual, graphic, or alphanumeric format, such as the interface previously described herein. Communication with external devices, such as a print device, may occur using various communication ports 540. An illustrative communication port 540 may be attached to a communications network, such as the Internet, an intranet, or the like.

The hardware may also include an interface 545 which allows for receipt of data from input devices such as a keyboard 550 or other input device 555 such as a mouse, a joystick, a touch screen, a remote control, a pointing device, a video input device and/or an audio input device.

The hardware may also include a storage device 560 such as, for example, a connected storage device, a server, and an offsite remote storage device. Illustrative offsite remote storage devices may include hard disk drives, optical drives, tape drives, cloud storage drives, and/or the like. The storage device 560 may be configured to store data as described herein, which may optionally be stored on a database 565. The database 565 may be configured to store information in such a manner that it can be indexed and searched, as described herein.

The computing device of FIG. 5 and/or components thereof may be used to carry out the various processes as described herein.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A system comprising:

a first powder hopper configured to provide a first powder to a first pair of rollers;

a second powder hopper configured to provide a second powder to a second pair of rollers;

one or more first sensors, wherein each first sensor is configured to determine a characteristic of the first powder in the first powder hopper;

one or more second sensors, wherein each second sensor is configured to determine a characteristic of the second powder in the second powder hopper;

a first feeder hopper configured to provide the first powder to the first powder hopper;

a second feeder hopper connected to the first feeder hopper and configured to provide the second powder to the second powder hopper; and a processor in operable communication with the one or more first sensors and the first feeder hopper and the one or more second sensors and the second feeder hopper, wherein the processor is configured to cause the first feeder hopper to provide the first powder to the first powder hopper in response to the characteristic of the first powder in the first powder hopper being less than a first threshold and to cause the second feeder hopper to provide the second powder to the second powder hopper in response to the characteristic of the second powder in the second powder hopper being less than a second threshold.

2. The system of claim 1, wherein the first powder hopper is positioned adjacent to the first pair of rollers.

3. The system of claim 1, wherein: the one or more first sensors comprise a level sensor; and the characteristic of the first powder comprises a height of the first powder within the first powder hopper.

4. The system of claim 1, wherein: the one or more first sensors comprise a weight sensor; and the characteristic of the first powder comprises a weight of the first powder within the first powder hopper.

5. The system of claim 1, wherein the second powder hopper is positioned adjacent to the second pair of rollers.

6. The system of claim 1, wherein: the one or more second sensors comprise a level sensor; and the characteristic of the second powder comprises a height of the second powder within the second powder hopper.

7. The system of claim 1, wherein: the one or more second sensors comprise a weight sensor; and the characteristic of the second powder comprises a weight of the second powder within the second powder hopper.

8. The system of claim 1, wherein the first powder is the same as the second powder.

9. The system of claim 1, wherein the first powder is different from the second powder.

10. The system of claim 1, wherein the first and second feeder hoppers comprise a common reservoir of powder and first and second release points to deliver the powder to the first and second powder hoppers, respectively.

11. A method comprising:

providing first powder from a first powder hopper to a first pair of rollers;

determining, by at least one first sensor, a characteristic of the first powder within the first powder hopper; and delivering first powder from a first release point of a first feeder hopper to the first powder hopper in response to the characteristic of the first powder being less than a first threshold, wherein the first feeder hopper comprises a common reservoir of the first powder and multiple release points to deliver the first powder to multiple powder hoppers.

12. The method of claim 11, wherein the first powder hopper is positioned adjacent to the first pair of rollers.

13. The method of claim 11, wherein: the at least one first sensor comprises a level sensor; and the characteristic of the first powder comprises a height of the first powder within the first powder hopper.

14. The method of claim 11, wherein: the at least one first sensor comprises a weight sensor; and the characteristic of the first powder comprises a weight of the first powder within the first powder hopper.

15. The method of claim 11, further comprising:

providing second powder from a second powder hopper to a second pair of rollers;

determining, by at least one second sensor, a characteristic of the second powder within the second powder hopper; and delivering second powder from a second release point of the first feeder hopper to the second powder hopper in response to the characteristic of the second powder being less than a second threshold.

16. The method of claim 15, wherein the second powder hopper is positioned adjacent to the second pair of rollers.

17. The method of claim 15, wherein: the at least one second sensor comprises a level sensor; and the characteristic of the second powder comprises a height of the second powder within the second powder hopper.

18. The method of claim 15, wherein: the at least one second sensor comprises a weight sensor; and the characteristic of the second powder comprises a weight of the second powder within the second powder hopper.

19. A system comprising:

a first powder hopper configured to provide a first powder to a first pair of rollers;

a second powder hopper configured to provide a second powder to a second pair of rollers, wherein the first pair of rollers and the second pair of rollers comprise a set of horizontally aligned rollers;

a first sensor configured to determine a characteristic of the first powder in the first powder hopper;

a second sensor configured to determine a characteristic of the second powder in the second powder hopper;

a first feeder hopper configured to provide the first powder to the first powder hopper;

a second feeder hopper configured to provide the second powder to the second powder hopper; and a processor in operable communication with the first sensor and the first feeder hopper, and with the second sensor and the second feeder hopper, wherein the processor is configured to cause the first feeder hopper to provide the first powder to the first powder hopper in response to the characteristic of the first powder in the first powder hopper being less than a first threshold, and to cause the second feeder hopper to provide the second powder to the second powder hopper in response to the characteristic of the second powder in the second powder hopper being less than a second threshold.

* * * * *